United States Patent Office 3,598,613
Patented Aug. 10, 1971

3,598,613
PROCESS FOR MANUFACTURING COOKED EGG YOLK PRODUCTS
Robert L. Hawley, St. Louis, Mo., assignor to The Ralston Purina Company, St. Louis, Mo.
No Drawing. Filed Dec. 19, 1968, Ser. No. 785,362
Int. Cl. A23l 1/32
U.S. Cl. 99—113                                    16 Claims

ABSTRACT OF THE DISCLOSURE

A method for producing cooked egg yolk products which comprises heating and coagulating raw yolks, grinding or milling the coagulated yolks, forming said yolks into a desired shape and subsequently heating the resulting shaped yolks to form a solid, coagulated egg yolk product.

BACKGROUND OF THE INVENTION

The present invention relates to a method for preparing cooked egg yolks and, more particularly, relates to a method for preparing cooked egg yolks by means of subjecting said yolks to controlled heating conditions and grinding to produce egg yolk products having fine, edible texture simulating those of natural cooked egg yolks. Several methods are known in the art to produce cooked egg yolks for manufacturing egg yolk products. For example, one method heats raw egg yolks until coagulated, mashes the yolks into a paste, subsequently adds additional raw egg yolk to the paste and subsequently heats the mixture again to produce the desired product. The resulting product is stated to have improved texture resembling natural egg yolks; however, the products have not been entirely satisfactory. In another method, a slurry of egg yolks and water have been subjected to elevated temperatures by means of steam and pressure to produce a soft, creamy product; however, such products are not suitable for producing solid egg products, e.g., egg rolls. Therefore, it would be desirable to provide a method for producing egg products which would not only have the texture and consistency of natural egg yolks but also a solid product which would be suitable for making a variety of solid egg products.

SUMMARY OF THE INVENTION

In accordance with the present invention, improved egg yolk products are produced in a method which comprises heating raw egg yolks under controlled conditions to coagulate the yolks, grinding or milling the coagulated yolks, forming the ground yolks into a shape and subjecting the resulting shaped product to elevated temperatures to produce a solid yolk product. The product produced in accordance with the method of the invention has properties closely resembling the texture and consistency of natural egg yolks, i.e., the yolks have a fine consistency, are creamy and have a desirable, solid, somewhat crumbly texture.

PREFERRED EMBODIMENTS OF THE INVENTION

In a preferred method for producing the egg yolks of the invention, raw yolks are subjected to heat by means of steam injection and pressure to coagulate the yolks and form a solid or semi-solid product. Such results can be best accomplished in an apparatus commonly known as a Jet Cooker. In the Jet Cooker, the yolks are coagulated in the presence of steam heat and pressure together with a vigorous mixing action. Although there may be situations where it would be desirable to partially coagulate the yolks, it is generally preferred that the yolks be fully coagulated to a solid state upon initial heating.

The yolks should be heated to a temperature range of from about 165° F. to about 212° F. and preferably from about 175° F. to about 185° F. It is desirable that the yolk itself be heated to an internal temperature of about 180° F. The pressure employed should be in the range of from about 10 p.s.i. to about 85 p.s.i. and preferably from about 55 p.s.i. to about 65 p.s.i. Temperatures above those set forth cause the egg yolk to dehydrate and form undesirable color characteristics and as a result would be detrimental to the product. Temperatures below those set forth above would be insufficient to make the product economically feasible since the time required to produce coagulation at such lower temperatures is excessive.

After coagulating the yolks to a semi-solid or solid state as described above, the yolks are ground or milled to a fine wet paste. This step is essential in that it eliminates the formation of the normal gel structure that occurs when comminuted yolks are cooked under ordinary cooking conditions. It is important to produce crumbly, smooth-textured, cooked yolks that resemble the properties of yolks that have been cooked in the original yolk membrane. It is generally known that yolks cooked in their original membrane have a smooth and crumbly texture whereas yolks cooked out of the membrane have a rubbery or gel-like structure. The ground or milled yolks are placed into a mold of desired shape, e.g., sausage casings, and subjected to heat sufficient to coagulate the ground or milled yolk to form the final solid product. Such temperatures of the final heating step should be in the range of from about 180° F. to about 210° F. and preferably from about 190° F. to about 200° F. The internal temperature of the yolk should be about 180° F.

In an alternate mthod, the yolks may be coagulated to a semi-solid or solid state with the use of heat alone absent any pressure or stem. The temperature ranges would be similar to those set forth above. If air bubbles tend to form in the mixture, it may be desirable to subject it to vacuum treatment after grinding to draw off the entrapped air thereby providing a solid non-porous product. Such results can be accomplished by placing the ground coagulated yolks into a vacuum chamber for a time sufficient to draw off the entrapped air bubbles. It is to be understood that the vacuum treatment may also be employed in the preferred method as hereinbefore described. The coagulated yolk is then placed into a mold and finally subjected to heat sufficient to coagulate and form the solid yolk product of the invention.

Where desired, proteolytic enzymes may be employed in the raw yolks prior to initial heating to assist in the production of yolks having improved texture. Such enzymes serve to hydrolyze the protein present in the yolk providing a smoother texture for the finished product. Examples of such enzymes include papain, bromelin, pepsin, trypsin, and the like. The enzyme employed has a strength of about 6,000 hemoglobin units per gram of the enzyme material. Where such enzymes are employed, initial heating should be sufficient to not only coagulate the yolks to the desired state, but also should be sufficient to inactivate the enzyme which is employed in the process. Such temperatures are generally found to be in the range of from about 180° F. to about 200° F.

The cooked egg yolk products of the present invention have highly desirable properties which heretofore have not been produced in the art. The products have a solid physical structure yet provide a smooth, crumbly texture and consistency which is necessary to produce commercially desirable consumer egg products. The egg yolks of the invention may be used in a variety of food preparations such as surrounding the yolks with egg whites to produce egg rolls, deviled eggs, yolk spreads and the like.

The following examples are illustrative of the invention and are not intended to limit the scope thereof.

EXAMPLE 1

Egg yolks were placed into a steam jacketed kettle. Steam was released into the jacket and the yolks were coagulated to a solid product at a temperature of about 175° F. The coagulated yolk was removed from the kettle and passed through a conventional meat grinder equipped with ⅛ inch openings several times to grind the yolk to a smooth paste.

Entrapped air was removed by subjecting the ground yolk to a vacuum in a chamber for about 10 minutes. The yolk was placed into a sausage casing, sealed at both ends and the filled casing placed into a hot water bath having a temperature of about 200° F. and cooked for about twenty minutes until the internal temperature of the yolk attained a temperature of about 180° F.

The cooked product was removed from the hot water, placed into cold water, cooled until the internal temperature of the yolk was about 90° F. and the casing subsequently removed. The resulting product resembled natural egg yolks in that it had a soft textured, crumbly, palatable consistency.

EXAMPLE 2

The procedures of Example 1 were substantially repeated except that the yolks were only partially coagulated in the steam jacketed kettle. The resulting product had properties similar to those produced in accordance with Example 1.

EXAMPLE 3

Egg yolks are passed through a Jet Cooker at a steam pressure of about 65 p.s.i. and temperature of about 220° F. The yolks are cooked to a solid state under conditions that will raise the temperature of the yolks to about 180° F. The product is ground or milled to a fine wet paste, subjected to a vacuum chamber to remove entrapped air bubbles and placed into a sausage casing and sealed at each end. The filled casing is placed into a hot water bath having a temperature of about 200° F. for a time sufficient to raise the product temperature to about 180° F. The reheated product is then transferred to a cold water bath where the internal product temperature is reduced to about 90° F. The resulting yolk has a soft textured, crumbly, palatable consistency.

EXAMPLE 4

The procedures of Example 3 are substantially repeated except that the yolks are initially cooked to a semi-solid state prior to grinding. The resulting yolk product has properties similar to those produced in accordance with Example 3.

In place of the particular physical conditions of pressure, temperature, etc. employed in the examples, other conditions may be employed as hereinbefore described to produce egg yolk products having substantially the same properties.

What is claimed is:

1. A method for producing egg yolk products which comprises heating raw egg yolks out of their membrane to a temperature and for a period of time sufficient to coagulate the yolks, grinding the coagulated yolks to substantially eliminate the formation of a gel-like structure in the coagulated yolks, forming the ground yolks into a shape and subjecting the resulting shaped product to elevated temperatures sufficient to produce a solid yolk product.

2. The method according to claim 1 wherein the raw yolks are heated to a temperature in the range of from about 165° F. to about 212° F.

3. The method according to claim 1 wherein the raw yolks are coagulated in the presence of steam under pressure.

4. The method according to claim 1 wherein the shaped product is heated to a temperature of from about 180° F. to about 210° F.

5. The method according to claim 1 wherein the raw yolks have admixed therein a proteolytic enzyme.

6. The method according to claim 1 wherein the raw yolks are coagulated to a semi-solid state.

7. The method according to claim 1 wherein the ground coagulated yolks are subjected to vacuum treatment.

8. A method for producing egg yolk products which comprises subjecting raw egg yolks out of their membrane to heat by means of steam and pressure and for a period of time sufficient to coagulate the yolks, grinding the coagulated yolks to substantially eliminate the formation of a gel-like structure in the coagulated yolks, forming the ground yolks into a shape and subjecting the resulting shaped product to elevated temperatures sufficient to produce a solid yolk product.

9. The method according to claim 8 wherein the raw yolks are heated to a temperature of from about 165° F. to about 212° F.

10. The method according to claim 8 wherein the pressure is in the range of from about 10 p.s.i. to about 85 p.s.i.

11. The method according to claim 8 wherein the shaped product is heated to a temperature of from about 180° F. to about 210° F.

12. The method according to claim 8 wherein the raw yolks have admixed therein a proteolytic enzyme.

13. The method according to claim 8 wherein the raw yolks are coagulated to a semi-solid state.

14. The method according to claim 8 wherein the ground coagulated yolks are subjected to a vacuum treatment.

15. A method for producing egg yolk products which comprises heating raw egg yolks out of their membrane to a temperature of from about 165° F. to about 212° F. for a period of time sufficient to coagulate said yolks, grinding the coagulated yolks to form a wet paste and to substantially eliminate the formation of a gel-like structure in the coagulated yolks, subjecting the ground yolks to a vacuum treatment to remove entrapped air, placing the ground yolks into a mold, heating the mold containing the yolk to a temperature of from about 180° F. to about 205° F., cooling the mold and removing the yolk product from the mold.

16. A method for producing egg yolk products which comprises subjecting raw egg yolks out of their membrane to elevated temperatures in the range of from about 165° F. to about 212° F. by means of steam and pressures in the range of from about 10 p.s.i. to about 85 p.s.i. for a period of time sufficient to coagulate the yolks, grinding the coagulated yolks to form a wet paste, subjecting the ground yolks to a vacuum treatment to remove entrapped air, placing the ground yolks into a mold, heating the mold containing the yolk to a temperature of from about 180° F. to about 205° F., cooling the mold and removing the yolk product from the mold.

References Cited

UNITED STATES PATENTS

| | | | |
|---|---|---|---|
| 3,285,749 | 11/1966 | Shires | 99—113 |
| 3,216,828 | 11/1965 | Koonz et al. | 99—113 |
| 3,009,818 | 11/1961 | Jokay et al. | 99—113X |
| 1,870,269 | 8/1932 | Tressler | 99—113 |

JOSEPH M. GOLIAN, Primary Examiner